United States Patent [19]

Conerly

[11] 3,813,495

[45] May 28, 1974

[54] MEMORY CONTROL FOR TOLL SYSTEMS

[75] Inventor: Howard Jeffery Conerly, Milan, Tenn.

[73] Assignee: International Telephone and Telegraph Corporation, New York, N.Y.

[22] Filed: Dec. 11, 1972

[21] Appl. No.: 313,674

[52] U.S. Cl. .............................. 179/7 MM, 179/7 R
[51] Int. Cl. .............................................. H04m 15/06
[58] Field of Search ....... 179/7 MM, 9, 7 R, 7.1 TP, 179/8 R

[56] References Cited

UNITED STATES PATENTS

| | | | |
|---|---|---|---|
| 2,910,674 | 10/1959 | Wittenberg | 179/7 MM |
| 3,601,542 | 8/1971 | Gill et al. | 179/9 |
| 3,651,269 | 3/1972 | Le Strat et al. | 179/8 R |
| 2,910,674 | 10/1959 | Wittenberg | 179/7 MM |
| 3,748,392 | 7/1973 | Henquet et al. | 179/7 MM |

*Primary Examiner*—Kathleen H. Claffy
*Assistant Examiner*—Gerald Brigance
*Attorney, Agent, or Firm*—J. B. Raden; D. P. Warner

[57] ABSTRACT

A control system for recording toll information is disclosed for use with automatic toll systems for station-to-station telephone calls. The control system employs electronic logic circuits which, in response to signals generated in other components of the system, enable records to be made in the core memory relating to billing data including the identity of the calling party and the time during which a call is established. The core memory empties into a tape memory periodically after the recorded data has been checked for accuracy.

7 Claims, 9 Drawing Figures

MEMORY CONTROL FOR TOLL SYSTEMS

CROSS-REFERENCE TO RELATED APPLICATIONS

Attention is directed to a copending application of H. J. Conerly, No. 251,306 now Pat. No. 3,770,893 filed May 8, 1972, relating to a toll system for long distance telephone calls and entitled "CAMA/LAMA Transverter". This copending application has been assigned to the same assignee as the present invention. It is hereby incorporated by reference.

BACKGROUND OF THE INVENTION

1. Field of the Invention

The present invention relates to an automatic toll system for automatic telephone switching systems. It particularly relates to the control of recording equipment of use in such systems including core memories for intermediate storage and tape memories which serve as output storage means to the system.

2. Description of the Prior Art

Prior art toll recorders of use in automatic telephone systems have been largely electro-mechanical in nature and have been slow and inefficient. Many of these recorders have depended solely upon mechanically punched tape for records. This is a slow and inefficient process which is not readily adaptable to increases in system requirements. Those recorders employing magnetic tape and using an incremental, or one line at a time, tape recorder effectively have lost the capability of checking the data by full read back. This means that if a line of recorded information is found to be defective there is no way to replace it, since the source data is lost once the data is recorded on the tape.

SUMMARY OF THE INVENTION

It is an object of the present invention to provide for improved recording in a toll recorder. It is a related object to enable a toll recorder to operate faster and more efficiently than the recorders disclosed by the prior art. Further objects include the provision in an automatic toll recorder of means to store incoming data from a telephone switching system temporarily until a complete block of data has been assembled, and then to make a permanent record of the assembled data while maintaining the temporary record until the permanent record has been verified.

The foregoing objects and others ancillary thereto are preferably accomplished by the present invention through use, largely, of electronic processing means. The invention includes a memory control for use with means to receive, translate, format, store and record billing information relating to telephone toll calls. Data is received into the system in binary form from a telephone switching system having the capacity to provide signals identifying a calling party. Typically, it is received through a translator which is not a part of the present invention. In a preferred embodiment the data is in the form of a binary coded decimal, or BCD, signal. Demand signals are also received from the switching system to indicate when chargeable connections are sought, are established and when they terminate.

The present invention relates particularly to control systems for memory circuits including a core memory and a tape memory. The system gathers data indicating the identification of the calling party, the identification of the called party, duration of the call and any other data necessary for billing purposes. A check is made of the accuracy of the data in the core memory and it is transferred periodically, and non-destructively, into a tape memory. The tape memory is checked for error and the data is rerecorded if an error is found. The recording on the tape and check of accuracy each may be performed four times if errors are found, and then if error is still found an alarm will be sounded. When the tape is found to be correct the core memory is prepared to receive new data.

BRIEF DESCRIPTION OF THE DRAWINGS

The above mentioned and other features and objects of this invention and the manner of obtaining them will become more apparent, and the invention itself will be best understood by reference to the following description of an embodiment of the invention taken in conjunction with the accompanying drawings, in which.

DESCRIPTION OF PREFERRED EMBODIMENTS

Figure 1:
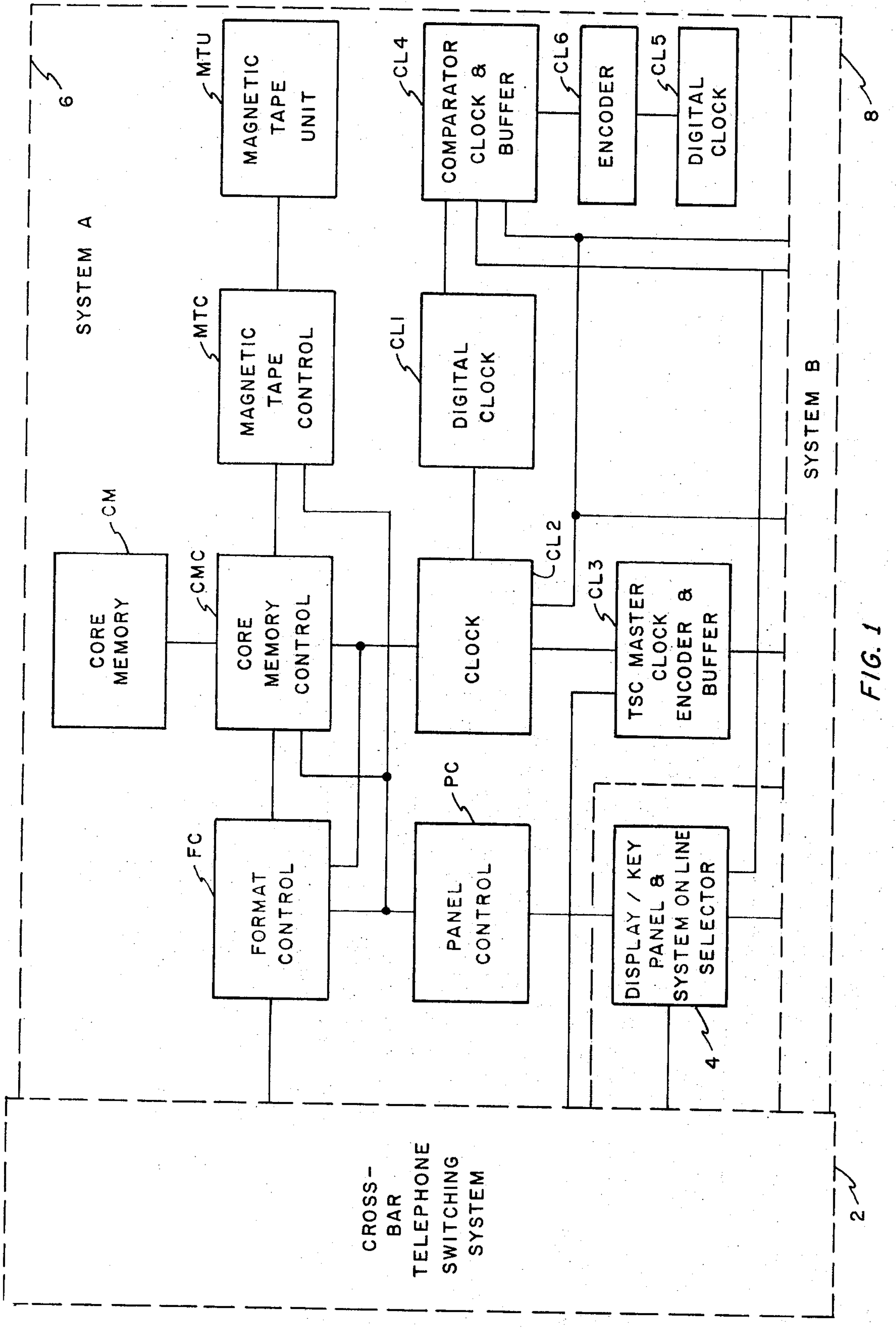
FIG. 1 is a block diagram illustrating interrelationships between the present invention, a toll system of the kind disclosed in the above identified patent application and a telephone switching system.

Referring to FIG. 1, it can be seen that one of two identical systems (system A) is shown in detail with a common Display/Key Panel & System On-Line Selector 4, hereinafter referred to as the panel. The following general description pertains to either of the two systems, A or B.

The equipment block 4 will determine which of the two systems is to be on-line and cause all data to be gated to the selected on-line system. The demand from the telephone system 2 indicating the presence of data is received by the Format Control FC and transmitted to the Core Memory Control. If the Core Memory Control CMC is not busy the demand is acknowledged. In the event the Core Memory Control is busy the demand is held until it can be processed or until the circuit times out, drops off for a second trial, or for operator handling. The demand is delayed to allow for relay bounce to settle. The data is then checked for correct parity in the Format Control. If all data is correct, it is loaded into a Core Memory CM by the Core Memory Control CMC. If a failure or error occurs, certain steps are taken depending on entry type, whether it is the first or second trial, and the location of failure. In preferred embodiments commercially available core memories have been adapted to use in this system.

The data is temporarily stored in the Core Memory CM. Once the data is stored correctly, the demand is removed by a release signal to the telephone system. The Core Memory Control continues to store entries in the Core Memory until it contains a block of data. When the Core Memory contains a full block of data, the Core Memory Control will signal the Magnetic Tape Control MTC to start the Magnetic tape unit MTU and busy itself to any other entries. When the tape unit is ready to record, the data is clock out of the Core Memory CM through the Core Memory Control CMC and the Magnetic Tape Control MTC and finally onto the magnetic tape. When the Core Control has allowed all data to be transferred to tape, a signal is passed to the Magnetic Tape Control MTC to stop the tape unit. If any errors were detected while writing the data onto the tape, the Core Control stays busy and tries to transfer the data again; if no errors were detected, the Core Busy signal is removed and the Core Control is ready to receive another demand.

CLOCK SIGNALS

All time information required in the data processing is derived from a commercially available Digital Clock CL1 and from the Master Clock Encoder CL2 in the respective A or B systems. The encoder CL2 also transfers the time from the digital clock through the TSC Master Clock Buffer CL3 to operator positions coupled to the telephone switching system. The choice of which Master Clock Encoder and TSC Master Clock Buffer to use is determined by the Panel 4. As a result, the operator always has the time being used by the on-line system.

The clocks are kept in a specified tolerance by the Comparator Clock CL4. If any of the three digital clocks drift out of the specified tolerance, an alarm is generated for the system containing the incorrect clock.

The Panel Control PC transmits data to display lamps or generates commands, on a manual signal, which are gated to the various parts of the off-line system. The signal indicating the on and off-line system is received from the Display/Key panel and System On Line Selector, or Panel, 4.

The Magnetic Tape Control serves as an interface between the magnetic tape unit and the core control. In this way the Transverter can work with either 7 track or 9 track tape units, which are commercially available at any standard or non-standard density or transfer rate after only minor changes in this one circuit.

CORE MEMORY CONTROL

Figure 2:
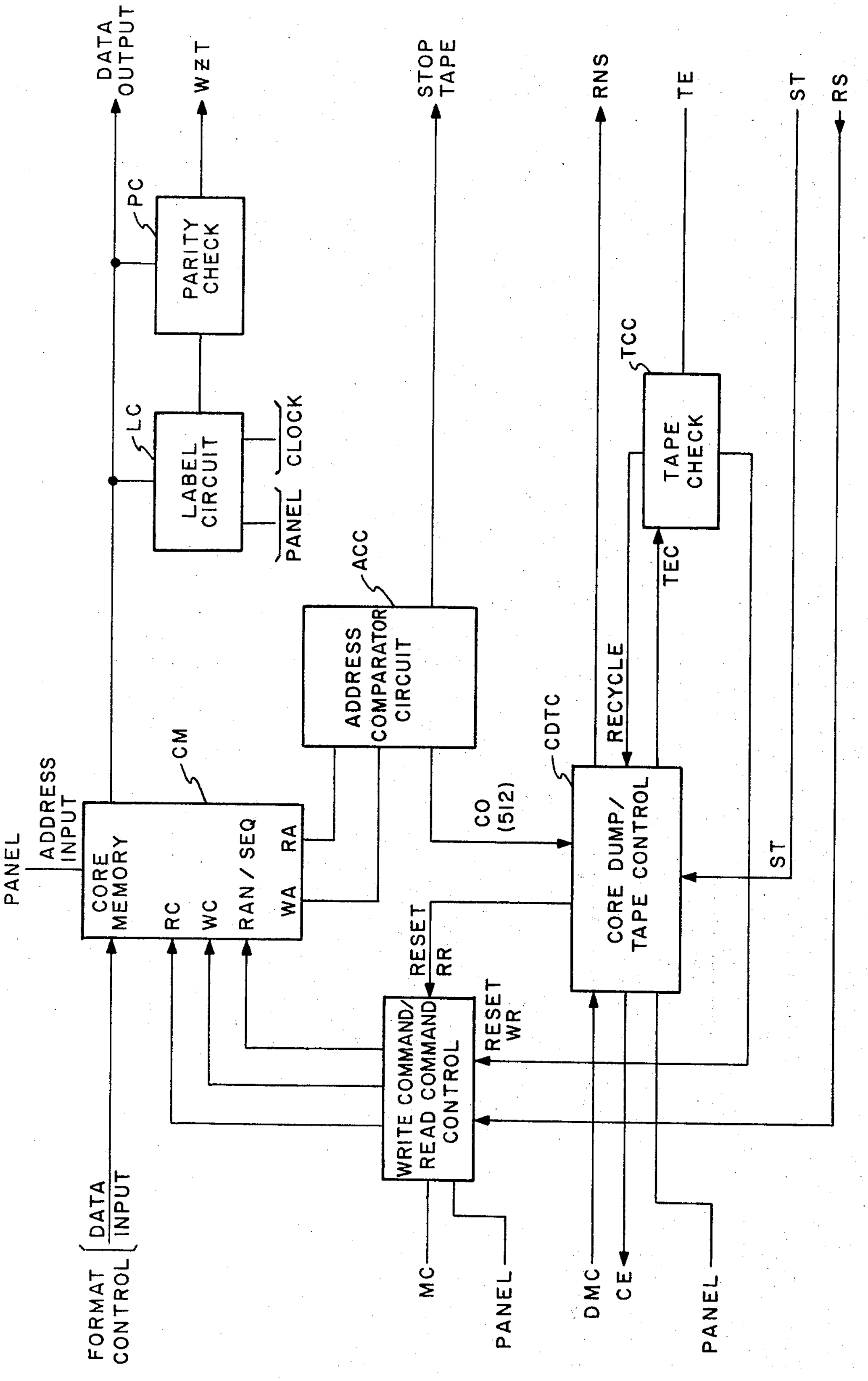
FIG. 2 is a block diagram showing the core memory as a block and details of the core memory control (CMC in FIG. 1)

FIG. 2 is a block diagram showing Core Memory Control circuits. In this diagram a circuit demand is received over line DMC from the Format Control, shown as a block FC in FIG. 1. This demand is applied to the Core Dump /Tape Control CDTC portion of the block diagram of FIG. 2. If the core memory is not busy, that is, if it is not dumping on tape or performing any of its other functions, a Core Enable Signal is returned to the Format Control via the CE lead. When the Format Control receives confirmation of this demand on the CE lead, it will present data on the data input to the memory circuit.

At this same time a clock pulse is transmitted to the write command/read command, or WC/RC control. It in turn will take the clock pulse received and provide an 800 nanosecond pulse to the core memory circuit CM. The core memory will then store data received over the data inputs and also advance the write address register (not shown). In this way, data coming into the core memory circuit is stored in sequential addresses up to a particular address. This particular address is determined by whether the system is working with seven or nine track tape. In a particular embodiment, nine track tape was chosen and the particular address, which may be called the cut-off address, was address 512.

Figure 3:
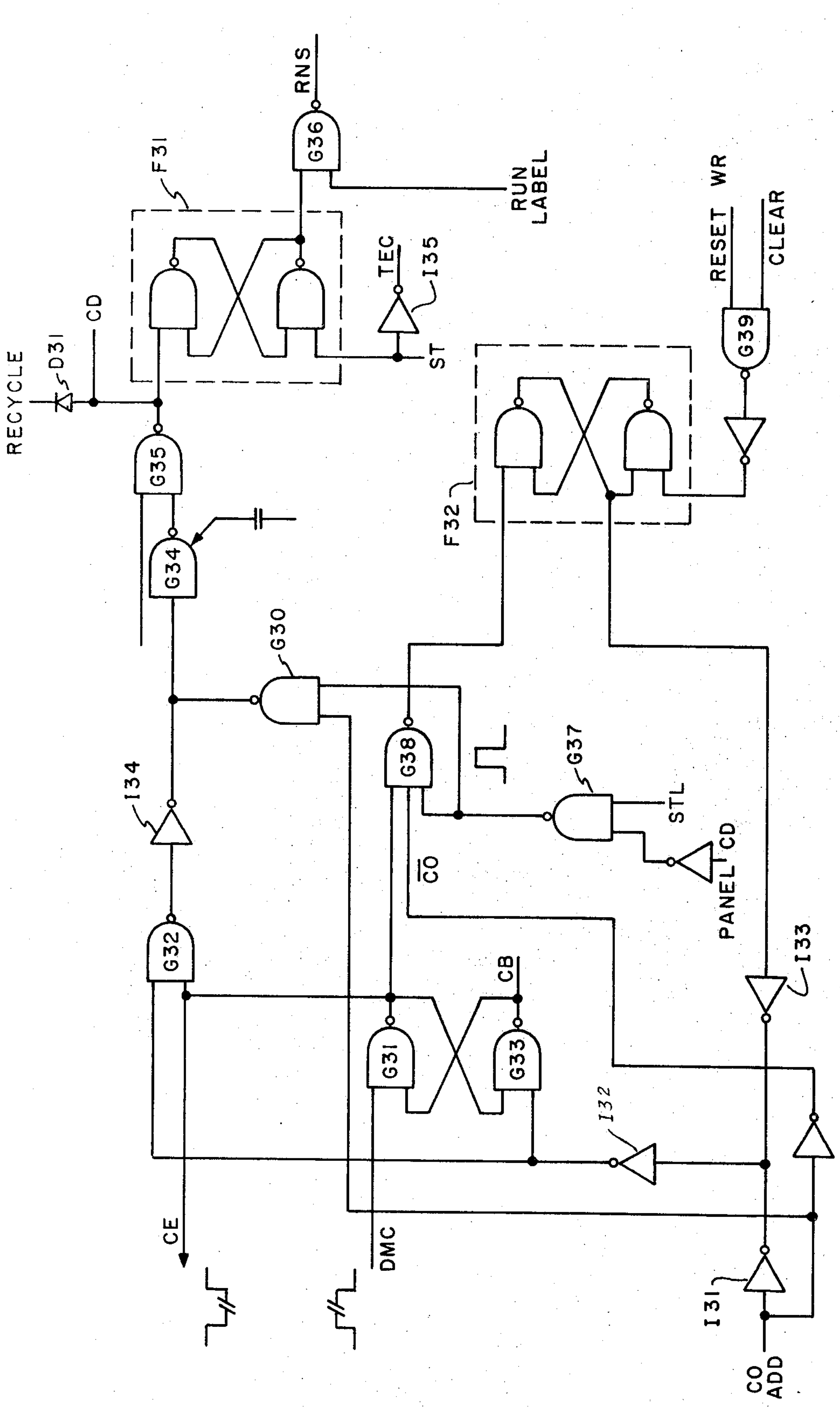
FIG. 3 is a block diagram showing the core dump and the tape control (CDTC in FIG. 2)
Figure 5:
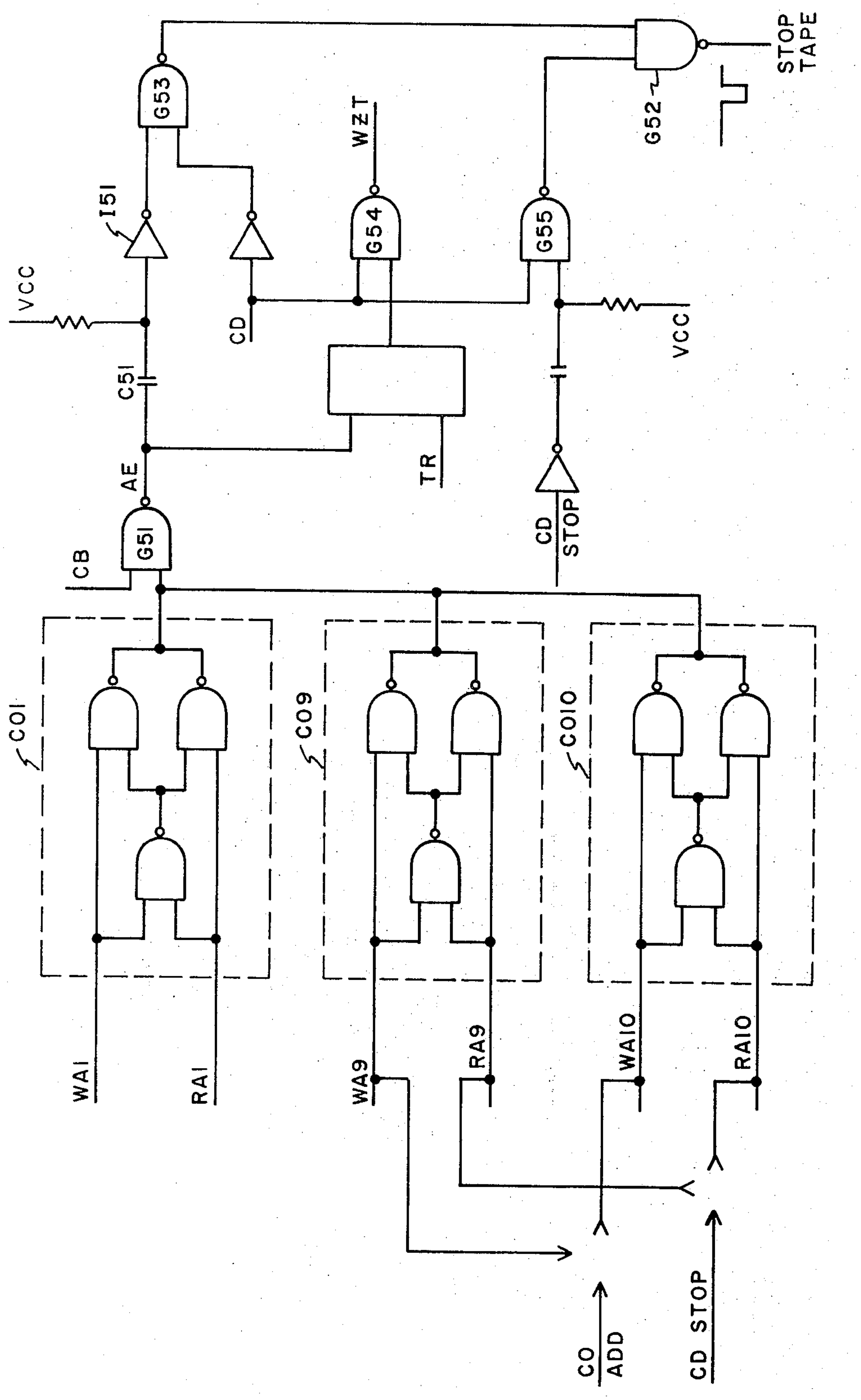
FIG. 5 is a block diagram showing an embodiment of address check circuits (ACC in FIG. 2)

When the signal indicating the cut-off address is detected by the address comparator circuit ACC (FIG. 5), a signal is extended on the CO lead, or cut-off lead, to the core dump/tape control, or CD/TC (FIG. 3). This signal will cause the core dump/tape control circuit to start the tape and busy the memory so that any demands coming in from the Format Control from this time on will be held, since there will be no core enable signal back to the format control. At this time the memory is busy and the tape has been given a run command on the RNS lead, (Run Normal Speed).

The next thing required is that the Read Register (RR — not shown) be reset to zero. This is done at the same time a run command is given to a tape unit. A signal is transmitted over the lead "Reset RR" to the WC/RC control to reset the Read Register. This will cause the WC/RC circuit to put the memory in a random mode which allows the memory to go to any address in the core. The address input from the control panel will be zero, so the memory is in random mode and the address inpt is zero and a read command is generated. This read command will in turn set the read register to zero.

All that remains is for the tape unit to get up to its proper operating speed, which takes approximately 10 ms, and to send out clock pulses to the core memory circuit. These clock pulses are received into the memory circuit via the RS lead or Read Strobe. These pulses go first to te WC/RC control circuit which will advance the Read Register which in turn determines which address will be read. The data read is presented on the data output leads. These output data leads go to the tape control unit and with each RS data is written on to the tape unit. This procedure continues while the address comparator circuit (ACC) compares a write address, which is no longer changing, to a read address, which started at zero and advances with each RS. When the two addresses are equal, a signal is transmitted to the tape control circuit (MTC) to stop the tape. At this time, depending on whether its a seven or nine track tape, a signal is returned from the tape control on the ST lead to the core dump tape control circuit CDTC. This will stop the tape by removing the RNS signal.

At the same time the tape is stopped, a signal TEC is presented to the tape check circuit TCC. This signal is the TEC siganl or Tape Error Check. The TCC circuit will check to see if any tape errors were encountered while the block of data was being written on tape. If there were no errors, a reset WR signal is sent to the WC/RC control to reset the Write Register to zero. Since the data is written correctly on tape there is no reason to hold the inforation in the core memory any longer. The core memory is erased in the same way the Read Register is reset to zero at the beginning of the core dump, by going to random mode and generating one write command and then returning to sequential mode. At this time, the Write Register is equal to zero and the memory is cleared and is ready to receive a new demand from the Format Control. This entire procedure has taken approximately 30 ms, assuming nine track tape is in use.

If an error on the tape is discovered, the Write Register will not be reset to zero, since the data has not been transferred to the tape correctly. In this case a signal is sent back from the tape check circuit to the core dump tape control on the recycle lead. This will cause the entire dump procedure to be repeated; that is, the Read Register will be reset to zero, the tape restarted and the data transferred to tape again in the same sequence as on the first core dump. At the end of this core dump, the addresses would be equal, the tape stopped, and again the tape error check would be made. This whole sequence is repeated a maximum of four times. If, after the fourth time tape errors are still encountered, an alarm is generated and this system is put in an off-line condition.

Following the process of writing data on tape, a parity check is made in a parity check circuit PC. If a parity error is encountered on the data being written out of core memory, a signal "Write Z's on tape" is transmitted to the tape control circuit on the WZT lead. This signal will prevent incorrect data from being deliberately written on the tape. In the event a parity failure is detected on data coming out of the core memory, a Z is written on the tape in place of this incorrect data.

There is another function of the core memory control circuit which should be considered. This function is the generation of labels to go on tape. These labels will contain information pertaining to the area code and the office code of the telephone office. They also contain information concerning the month, the day, the hour, the minutes, and tenths of a minute. Also contained in these labels is information pertaining to the format in which all the data is written. There are three types of labels: Header, Trailer, and Transfer. All three of these label types may be manually initiated from the control panel. The Header label is also written automatically at midnight.

CORE DUMP AND TAPE CONTROL

A demand is received into the core dump and tape control CDTC by a positive signal over DMC at gate G31 to go low which causes the core enable lead to go low and one input to G32 to go low. This also signals the format control over CE that the core is enabled and that it can transfer data to the memory.

When the next entry is extended again, the DMC lead of FIG. 3 goes high, the CE lead goes low, and the entry is stored in the memory in the same manner as before. However, when the cut-off address is reached, the CO lead will go high causing the input to G33 to go high and one input to G32 to go high. When the demand is removed both inputs to G33 will be high which will cause this flip flop to set causing the core busy signal on the CB lead to go low. At this time, no further demands can reach the core memory circuit. At the same time that the core enable signal is removed, both inputs to G32 will be high causing a low output from G32 which is inverted by I34 and gated through the pulsing circuit G34, G35, which generates a negative pulse that will set F31, and put a low input on one input of G36. This will cause the output of G36 to go high generating a run command signal over RNS to the tape unit.

Figure 4:
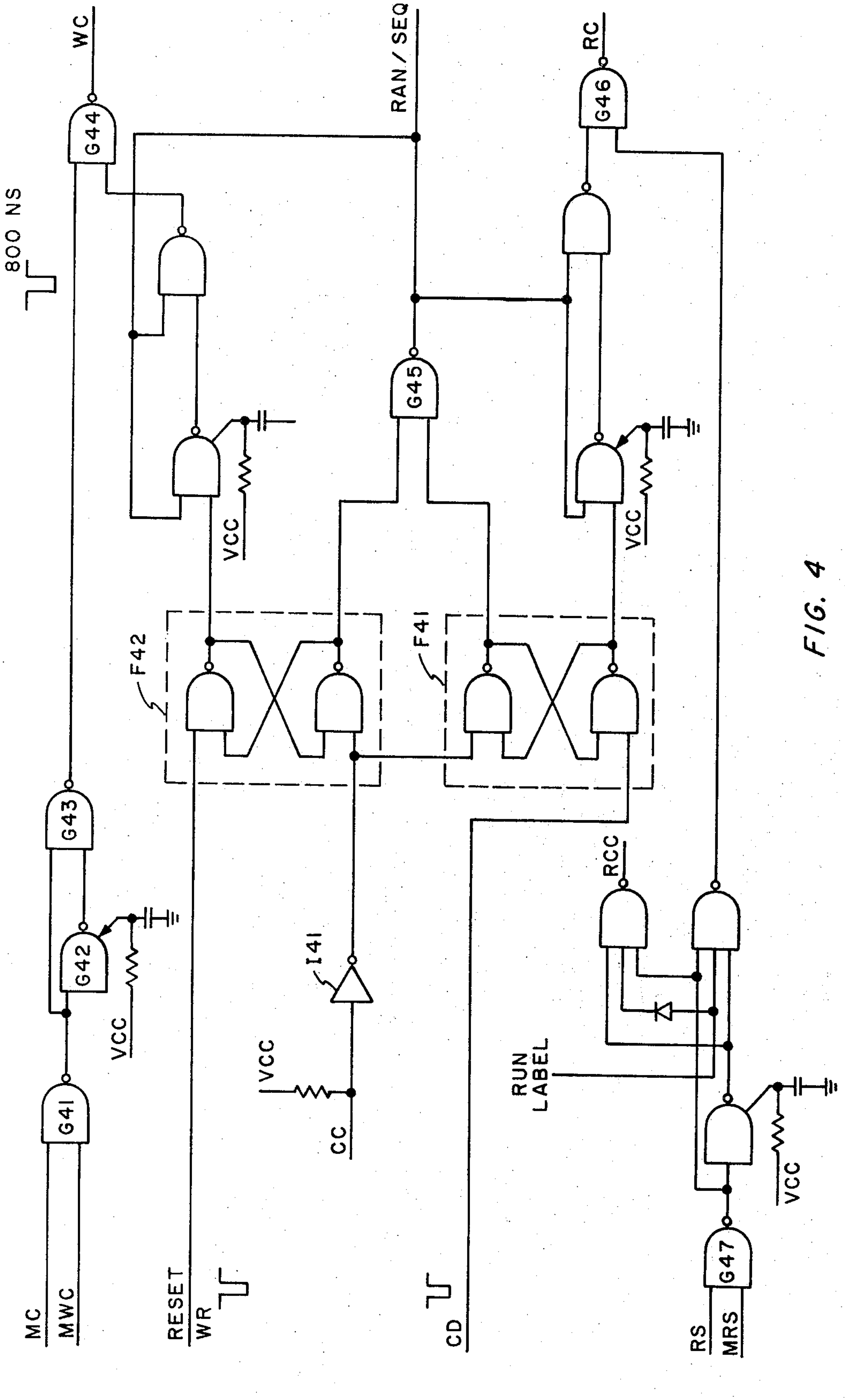
FIG. 4 is a block diagram showing an embodiment of the write command and read command control (WC/RC control in FIG. 2)

Gate G41 in FIG. 4, receives the clock pulse from the format control on the MC lead. This causes the output of gate G41 to go positive which by going through the pulsing circuit, G42, G43, generates a negative pulse at its output, the duration of which is determined by the RC time constant of the pulsing circuit. This negative pulse will be 800 nanoseconds in a typical case. Gate G44 receives this negative pulse and generates a 800 nanosecond positive going pulse which is extended to the memory circuit as a write command. These write commands continue until the entry is completed and the Format Control removes its demand which will in turn cause the removal of the core enable signal.

WRITE COMMAND AND READ COMMAND CONTROL

At the same time the run command signal is produced on RNS (FIG. 3), a pulse will be provided from G35 on the CD lead to set a flip flop F41, FIG. 4. When the flip flop F41 is set, the input to gate G45 will go low causing the output to go high. This will put the memory circuit into random mode. At the same time, the other output of the flip flop F41 will go into a pulsing circuit which is held inhibited while the memory circuit is in random mode. At the time the memory is in random mode and this flip flop F41 is set, an 800 nanosecond pulse will be generated and coupled through gate G46 to extend an 800 nanosecond read command over lead RC to the memory circuit. This will reset the Read Register to zero.

Figure 8:
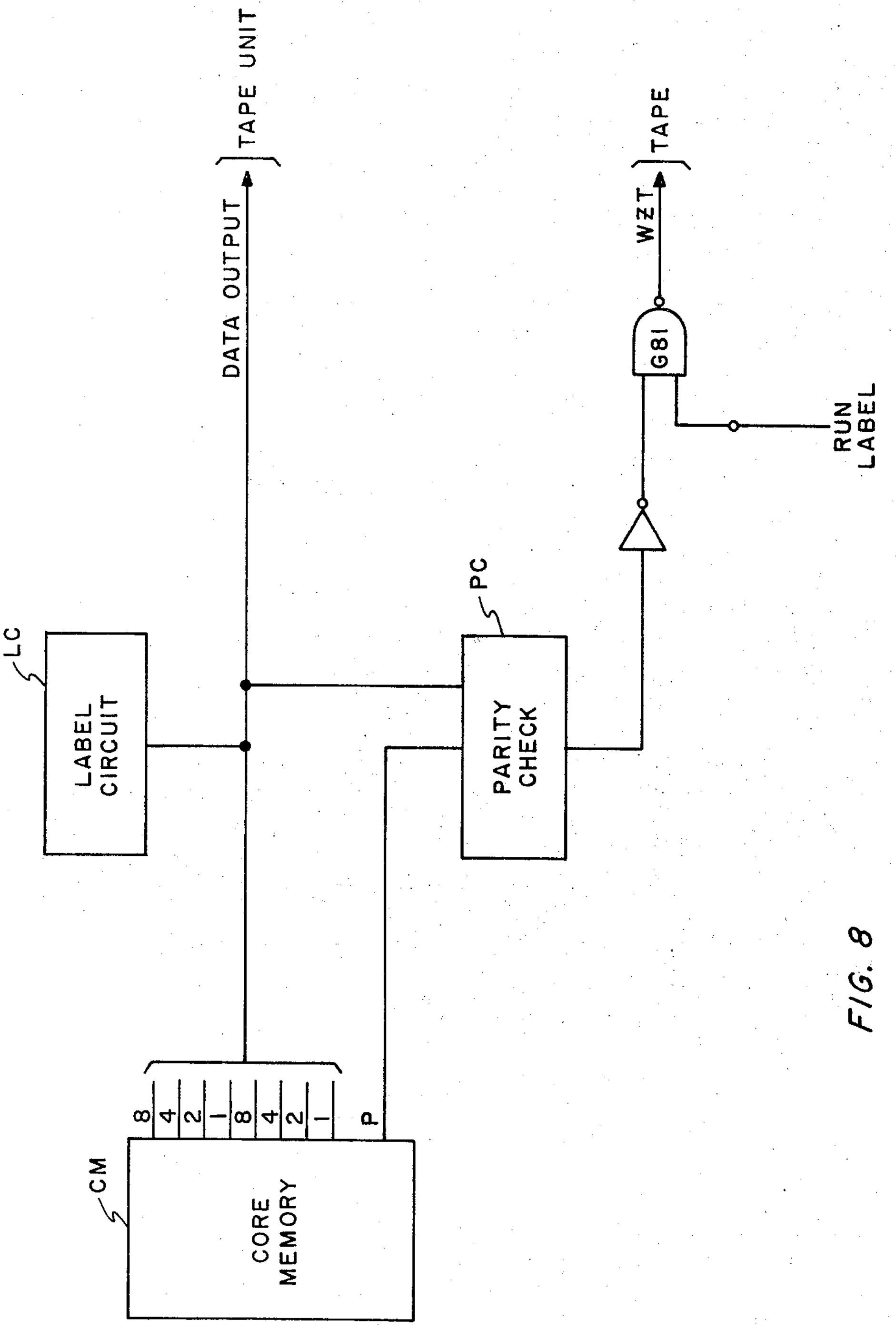
FIG. 8 is a block diagram showing an arrangement of logic circuits to provide a parity check (PC in FIG. 2)

The flip flop F41 will then be cleared by a Cycle Complete signal from the core memory that appears on the CC lead as a positive pulse and is inverted by I41. At this time the Read Register has been reset to zero and a run command given to the tape unit. When the tape unit ramps up to speed, it extends clock pulses on the RS lead, which appear at gate G47, FIG. 4. These pulses are gated through G47 through a pulsing circuit into gate G46 which will act as a read command and cause one word of data to appear at the core memory output. At this time the data will have its parity checked, ref. FIG. 8, and the data will be presented to the tape unit to be written. After this data is written on tape another read strobe is transmitted to the memroy and again one word of data is read, has its parity checked, and is written on the tape. If a parity failure occurs, gate G81 of FIG. 8 will be operated and the WZT lead will go true and a Z will be written on tape in place of the data.

COMPARATOR OR ADDRESS CHECK CIRCUITS

When the write address is equal to the read address (see the comparator circuits CO1–CO10 in FIG. 5) gate G51 will have its output go low, since all inputs will be high at that time. When the Address Equal signal AE is true, a negative pulse is coupled through capacitor C51 and through inverter I51, and is gated to Gate G52 which will transmit a negative pulse over the stop tape lead to the tape control unit. The tape control unit will decode the stop tape signal depending on whether seven or nine track tape is in use and return a stop signal ST to the core control and reset flip flop F31 (FIG. 3). This will remove the run normal speed signal to the tape unit and also through inverter I35 will generate the tape error check signal.

TAPE DATA CHECK

Figure 9:
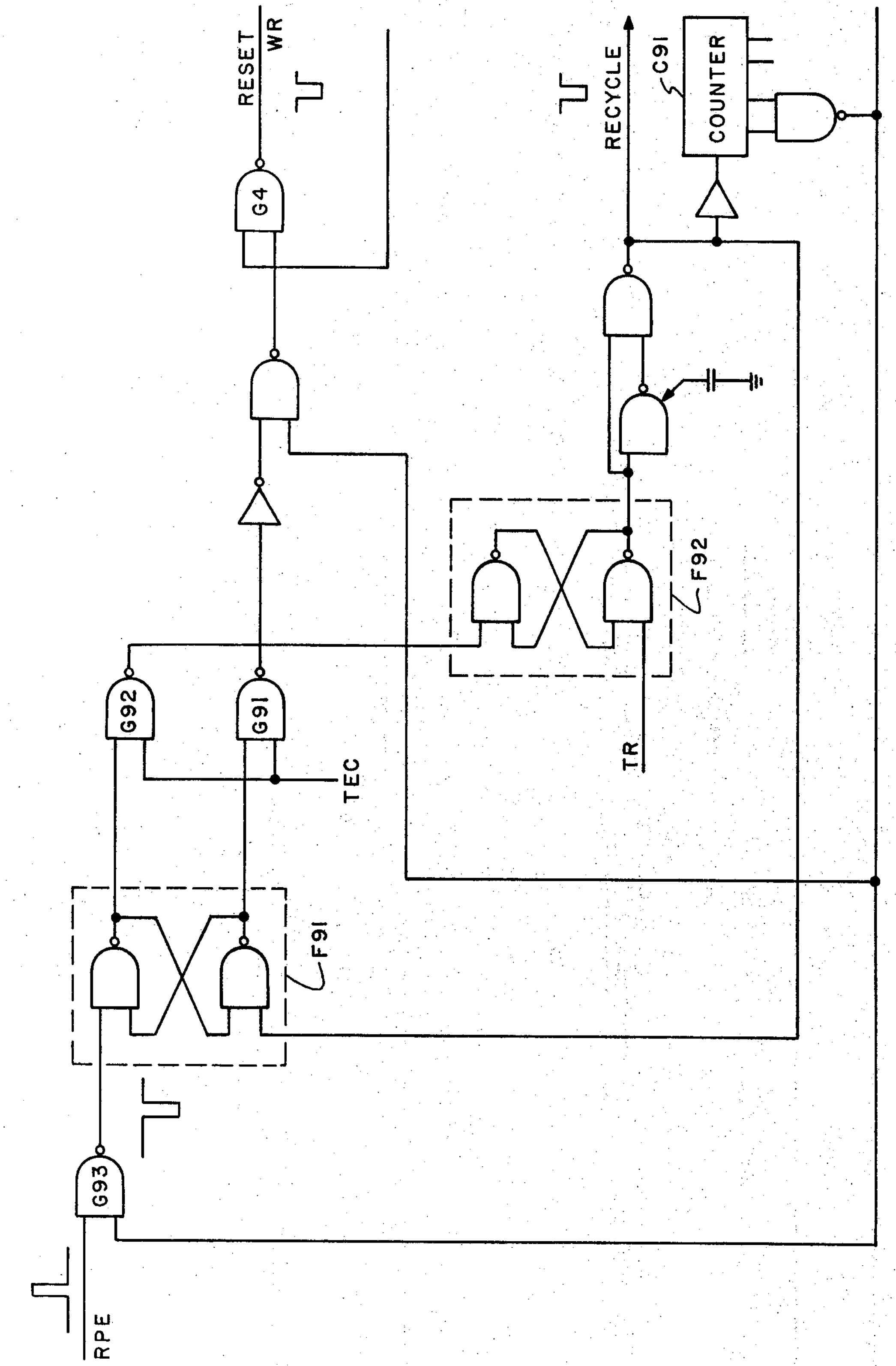
FIG. 9 shows an arrangement of gate circuits of use in providing a tape data check (TC in FIG. 2).

This tape error check is gated to Gates G91 and G92 of FIG. 9. These two gates along with the TEC signal will interrogate the status of flip flop F91. Flip flop F91 will contain the read parity error status. If any read parity errors occurred during the block of data, a positie pulse would appear on the RPE lead and be gated through gate G93 which will generate a negative pulse and set flip flop F91, so if flip flop F91 is set due to a read parity error, the TEC signal would gate this status through gate G92 and set flip flop F92. This flip flop would stay set until the tape running signal (TR) goes low which will then reset that flip flop and cause a negative pulse to be generated by the pulsing circuit attached to the output of F92. This will advance a counter C91 and put a negative signal out on the recycle lead which will go back to FIG. 3 into diode D31 wich will recycle the complete core dump procedure and also reset flip flop F31. If on the second core dump no tape errors were encountered, F31 would not be set, so the output of gate G31 would go low when the Tape Error Check signal came true. This would gate a signal through to gate G33 which will give a command to reset the write register. This command comes in to flip flop F42 of FIG. 4. This will cause the reset of write register to zero in the same way that the read register was set to zero by causing the memory system to go to random mode, extending an 800 nanosecond write command, and then allowing the cycle complete signal from the core memory to reset the flip flop.

For a manual core dump, two conditions can occur, depending on whether the write address is less than the cut-off address or greater than the cut-off address. With the write address less than the cut-off address, a positive pulse will be applied from the control panel on the CD lead leading to gate G37 of FIG. 3. This will give a positive output pulse on the input of gate G38. Since the cut-off address is not true, then a negative output will appear at Gate G38 which will set the core dump flip glop F32 and initiate a core dump procedure. By setting the CD flip flop F32, the input to gate G32 will go high due to inverters I32 and I33. This will simulate the cut-off address being true and cause a core dump to occur in exactly the same manner as previously described for a normal core dump.

However, (FIG. 5), the CD lead is high and therefore will inhibit gate G53, and enable gate G54 so that when the addresses are equal the Z's will be written on tape by the WZT output signal of gate G54. This also enables one input to gate G55 so that when the core dump stop address comes up, which for nine track tape will be address 512 of the Read Register, a negative pulse will be generated on the input of gate G55, thus causing a positive pulse on the output and a negative pulse on the output of gate G52. This is the stop tape signal going to the tape control unit (MTC, FIG. 1).

The tape control unit will return a stop signal to the core control the same as with a normal core dump. Also, the tape error check is performed. If no errors are detected, the core dump flip flop is reset by gate G39 (FIG. 3). In this way a constant block length of 512 characters is obtained. All data written in core will be dumped on tape and the remainder of the 512 characters will contain Z's.

The second condition for a manual core dump occurs when the address is greater than the cut-off address. In this case a positive pulse is received from the CD lead (FIG. 3). Only in this case the pulse out of gate G37 appears at the input and is gated through gate G30. In this way a normal core dump is simulated since a negative pulse on the output of gate G36 or the output of inverter I34 will initiate a core dump, however, the core dump flip flop F32 is not set. The memory system will start the tape and transfer all data onto magnetic tape and extend a stop tape signal to the core control which will stop the tape by resetting flip flop F31 (FIG. 3), and extending a tape error check sinal to FIG. 9, Gates G91 and G92. This is the same procedure followed by a normal core dump operation as described earlier.

LABEL CONTROL CIRCUITS

Figure 6:
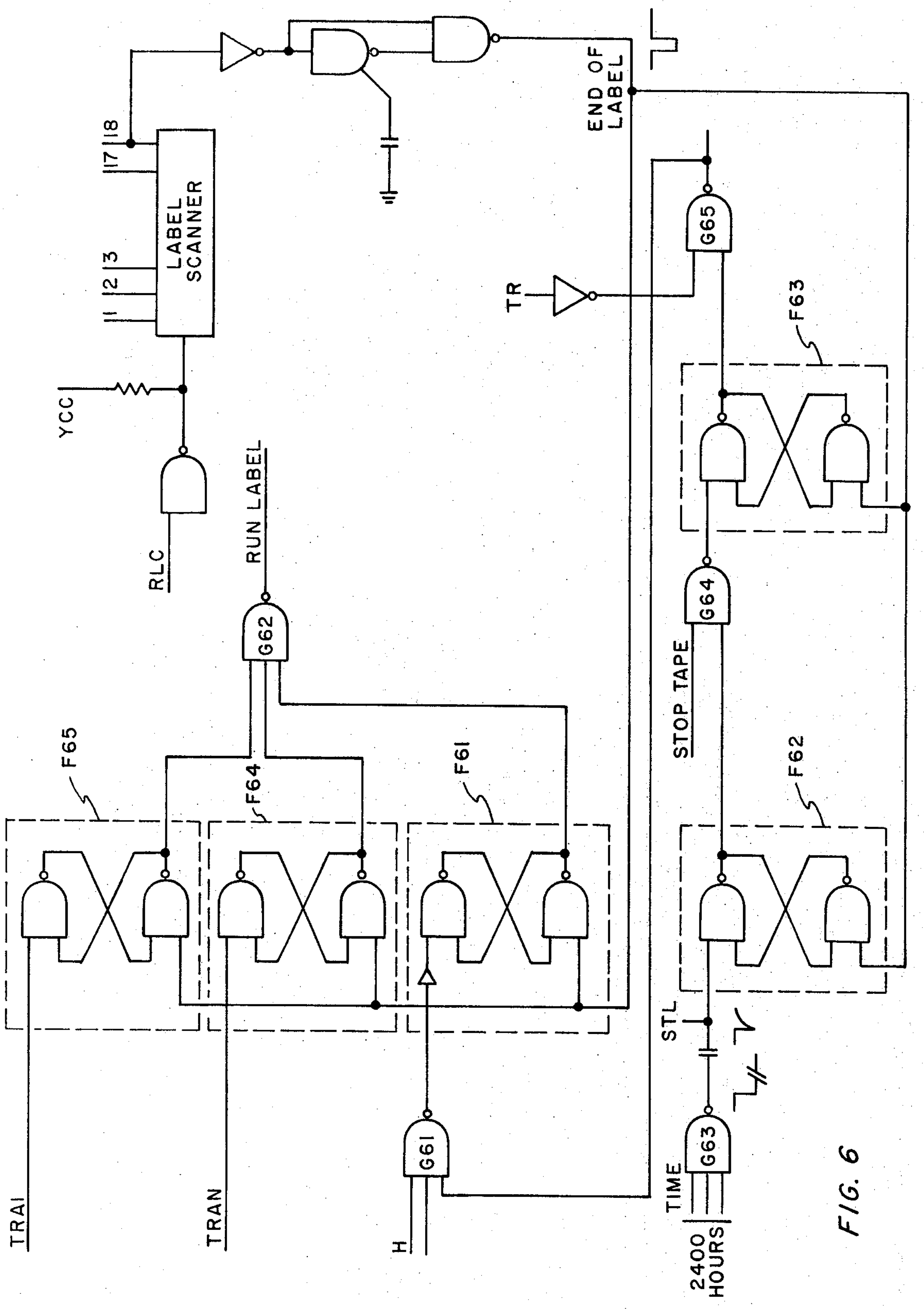
FIG. 6 is a block diagram showing an embodiment of a label control (LC in FIG. 2)

The last function of the core control to be considered is the generation of identification labels to be written on magnetic tape. The labels are of three types: Header Labels, which would go on the beginning of a month's biling, Transfer Labels, which are used at the end of one tape and the beginning of another tape, and Trailer Labels, which are used at the end of the month's billing. The operation of the label circuit is indicated in FIG. 6. As an example, for a Header Label, a positive pulse would appear on Gate G61 from the control panel on the Header Label Lead H. This will generate a negative pulse and set flip flop F61. This will cause one of the inputs to gate G62 to go low, the output would then go high. This would cause a true condition of the Run Label lead.

The Run Label signal appears on the input of gate G36, FIG. 3. This will cause a run command on lead RNS to the tape unit and start the tape unit moving. When the tape unit gets up to its operate speed, it extends read strobes RS back to the memory circuit that appear on gate G47. These block pulses go through the pulsing circuit, since the Run Label signal is true (FIG. 4). The output of this pulse would appear on the RLC lead in FIG. 6. This RLC pulse will advance the label scanner in FIG. 6. This sannner functions in the same way as the scanner described in the Format Control circuit described in the previously cited copending Conerly application. This scanner will clock information on to the data leads to the tape unit, as indicated in FIG. 8. However, since the Run Label lead is true, gate G81 will be inhibited. The reason for this is no parity is generated for the label data. Therefore, incorrect parity checks would occur and cause Z's to be written on the tape due to the WZT lead being true on a parity failure. For this reason, the WZT lead is inhibited by the run label signal.

Figure 7:
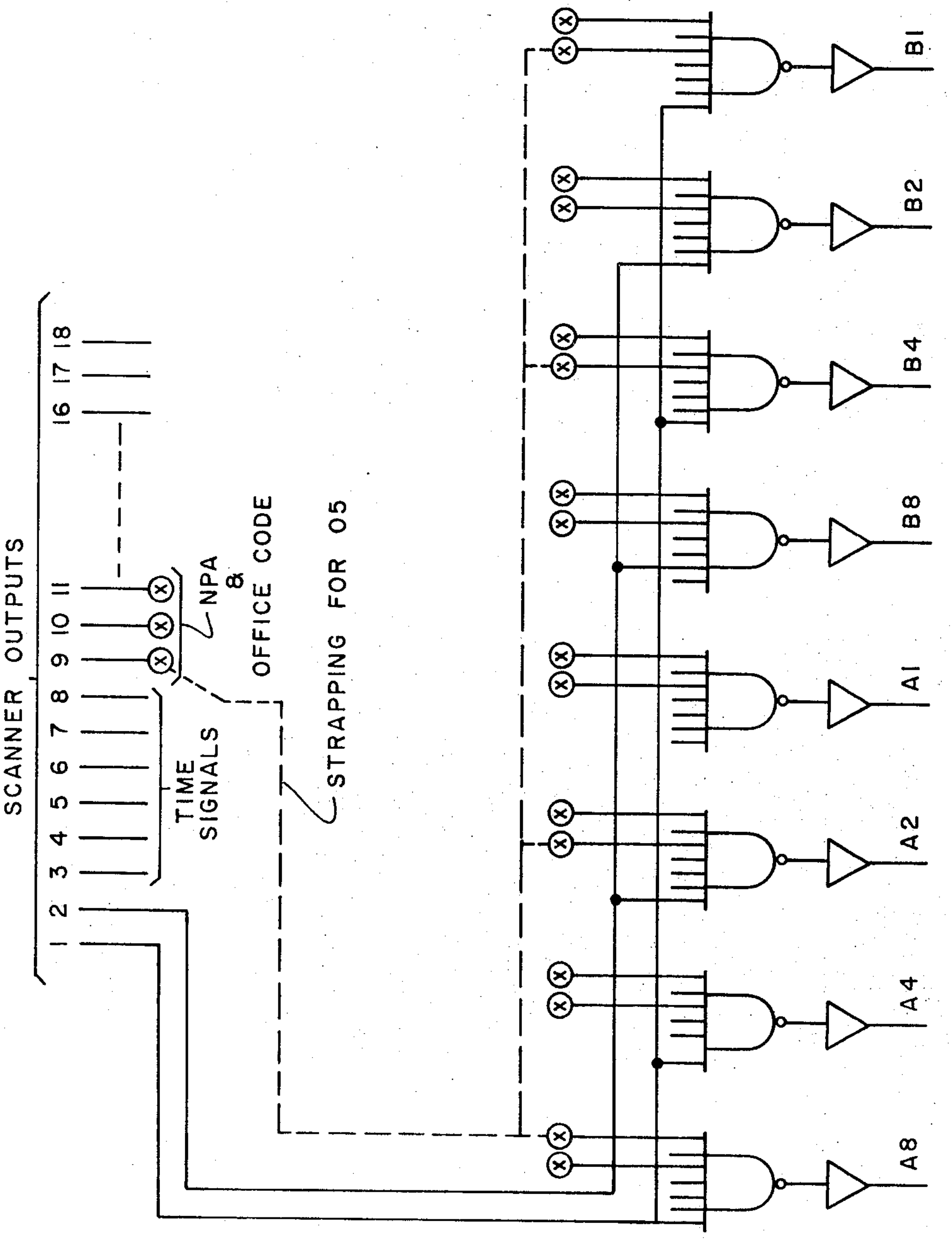
FIG. 7 is a block diagram showing an arrangement of logic circuits generating label words (part of LC in FIG. 2)

The data scanned by the label scanner contains the office code and area code strapping which is indicated by FIG. 7. The label information also contains the month, day, hour, minute, and tenth of a minute. Also contained would be an identification of the label type: Header, Trailer, or Transfer and the system and transport identity on line at this time. All of this data is written on tape twice in one label. At the end of the label, a negative pulse is generated called the End of Label Pulse, Reference FIG. 6. This pulse will reset the label flip flop F61 thus signaling the end of the label. When flip flop F61 is reset, this removes the Run Label signal and causes the tape to stop.

The Header Label is also automatically written at midnight. At exactly 2400 hours a negative signal is transferred through Gate G63 in FIG. 6, causing a negative pulse on the STL lead which will set flip flop F62 and also cause a positive pulse on the output of gate G65 in FIG. 6. This gate is used for initiating a manual core dump as previously discussed. When the manual core dump is completed the stop signal appears on the input of gate G64 in FIG. 6. At this time one input is high from the output of flip flop F62 and the output will have a negative pulse, the duration of which is equal to the stop signal. This will set flip flop F63 causing a high input on one input of gate G65.

When the tape stops running, which can be approximately 10 ms later, the TR or Tape Running Lead will go low causing the other input to Gate G65 to go high. This causes a negative output of gate G65 which appears at the input of Gate G61 as a negative signal. This is the same type signal on the input of G61 as the manual command for a Header label. Ths will cause the operation of flip flop G61 thus causing a Header label to be written. The label continues through as previously described and at the end of the label the End of Label Signal will reset flip flops F61, through F65. In this way, all cells in progress that have data stored in the core memory have their information transferred to tape and the rest of the block is filled with Z's prior to the midnight Header label so that after midnight the core memory will be starting at address zero with a new block of data.

SUMMARY OF OPERATION

The Core Memory Control responds to a demand from the Format Control and extends a core enable signal back to the Format Control. The Format Control in turn transmits data to the core memory which stores this information and checks the address. When a full block of data has been received by the Core Memory, and the demand removed for the last entry, the core memory will busy itself out and start the tape unit along with resetting the Read Register to zero. When the tape unit has started, clock pulses read out one word of data from the core memory at a time. The parity of this data is checked and is transmitted to the tape unit.

At the point where the Read Register is equal to the Write Register, during the read out from the Core Memory, a stop tape signal is generated. This is transmitted to the tape control which will, in turn, return a stop signal to the core memory control. The core memory control will then remove the run command to the tape unit and perform a tape error check. If errors have occurred, the data is again written on tape. This sequence, includng read-out to the tape, parity check and type error check may be repeated as many as four times. If after the fourth time the data has still not been written correctly on the tape, the system is Busied and an alarm is sounded. If, however, at the end of any of the sequences, the data is written correctly the tape error check will cause the write address to be reset to zero and the Busy signal will be removed from the core memory so that it can acknowledge another demand. The entire procedure for a normal core dump wihtout tape errors takes approximately 30 ms.

The core memory control, through its label and generator, also writes the labels: Header, Trailer, and Transfer labels. Each of these three types may be initiated manually. The Header may also be initiated automatically. This is done at midnight at which time a manual core dump will be initiated after which a Header Label will be automatically written. In this way, prior to midnight all data is transferred on to tape and the core memory is restarted at zero immediately after the Header Label.

The core control can also have its data transferred onto magnetic tape by manual command from the control panel which will cause all data to be transferred onto magnetic tape. This command can occur with the address less than the cut-off address, in which case the data will be written on tape up to the point where the addresses are equal, that is, Read address equals the Write Address. After which, the remainder of the block will be filled with Z's. If the address is greater than the cut-off address, the manual core dump simply simulates an automatic core dump and all data is transferred onto tape. In either case, read parity errors are checked and if a failure occurs the system is recycled to transfer the data a second, a third, or a fourth time before an alarm is sounded.

While the principles of the invention have been described above in connection with specific apparatus and applications, it is to be understood that this description is made only by way of example and not as a limitation on the scope of the invention.

I claim:

1. A system for controlling recording apparatus for a toll switching system comprising:

core memory control means for receiving demand signals which indicate a requirement that data be recorded from a switching system, said core memory control means including a first control circuit and a second control circuit, said first control circuit responding to receipt of said demand signals to supply a core enable signal when a core memory is available for recording, means coupling said second control circuit to receive a clock signal from said first control circuit when the core is available for recording, said second control circuit including means providing a pulse to prepare a core memory to receive data, data input terminal means coupled to receive data for recording in a core memory, said first control circuit including a core dump circuit and a tape control circuit, and said second control circuit including write command and read command circuits for providing control signals to operate a core memory.

2. A system as claimed in claim 1, including a label circuit coupled to the data output line of said core memory, said label circuit including scanner means to provide an appropriate label for recording in said tape unit at the beginning of a billing period for recording in said tape unit at the end of the billing period and to indicate a transfer from one type to another.

3. A system as claimed in claim 2, in which the label circuit includes means for generating label information including the month, day, hour, minute and tenth of a minute.

4. A system for controlling recording apparatus for a toll switching system comprising:

core memory control means for receiving demand signals which indicate a requirement that data be recorded from a switching system, said core memory control means including a first control circuit and a second control circuit, said first control circuit responding to receipt of said demand signals to supply a core enable signal when a core memory is available for recording, means coupling said second control circuit to receive a clock signal from said first control circuit when the core is available for recording, said second control circuit including means providing a pulse to prepare a core memory to receive data, data input terminal means coupled to receive data for recording in a core memory, an address comparison circuit coupled to a core memory for comparing the address of data being recorded in the core memory with a predetermined address, said address comparison circuit providing a cut-off signal to the first control circuit when there is coincidence in the addresses, said first control circuit responding to said cut-off signal to remove the core enable signal and prevent the receipt of further data over the data input terminal means, and said address comparison circuit providing stop tape signals to stop a magnetic tape unit when there is coincidence in the addresses.

5. A system as claimed in claim 4, in which the first control circuit responds to said cut-off signal to supply a reset signal through write and read signal means to the core memory causing the core memory to appear busy and setting the core memory in a random sequence to read out recorded data over a data output line to a tape memory.

6. A system as claimed in claim 4, including a tape control circuit coupled responsive to said demand signals to provide a run normal speed signal to a magnetic tape unit and responsive to said cut-off signal to cut-off said run normal speed signal.

7. A system as claimed in claim 5, including a parity check circuit for checking parity of data read out of the core memory and in the event of parity failure causing a signal indicating "no data" to be read onto the tape.

* * * * *